(12) United States Patent
An et al.

(10) Patent No.: US 11,021,648 B2
(45) Date of Patent: Jun. 1, 2021

(54) ENERGIZED NATURAL GAS FOAM DELIVERY DEVICES AND METHODS

(71) Applicant: Halliburton Energy Services, Inc., Houston, TX (US)

(72) Inventors: Jun Su An, Houston, TX (US); Tatyana V. Khamatnurova, Spring, TX (US); Antonio Recio, III, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/599,781

(22) Filed: Oct. 11, 2019

(65) Prior Publication Data

US 2021/0108129 A1    Apr. 15, 2021

(51) Int. Cl.

| | |
|---|---|
| *C09K 8/594* | (2006.01) |
| *E21B 43/16* | (2006.01) |
| *E21B 17/18* | (2006.01) |
| *C09K 8/588* | (2006.01) |
| *C09K 8/584* | (2006.01) |
| *E21B 43/26* | (2006.01) |
| *E21B 47/06* | (2012.01) |

(52) U.S. Cl.
CPC ............. *C09K 8/594* (2013.01); *C09K 8/584* (2013.01); *C09K 8/588* (2013.01); *E21B 17/18* (2013.01); *E21B 43/16* (2013.01); *E21B 43/26* (2013.01); *E21B 47/06* (2013.01)

(58) Field of Classification Search
CPC .......... C09K 8/594; C09K 8/584; E21B 43/16
USPC ........................................................ 166/300
See application file for complete search history.

(56) References Cited

U.S. PATENT DOCUMENTS

| | | |
|---|---|---|
| 3,937,283 A | 2/1976 | Blauer et al. |
| 4,730,676 A | 3/1988 | Luers et al. |
| 4,869,321 A | 9/1989 | Hamilton |
| 9,181,789 B2 | 11/2015 | Nevison |
| 9,828,815 B2 | 11/2017 | Silveira et al. |

(Continued)

FOREIGN PATENT DOCUMENTS

| | | |
|---|---|---|
| CN | 202165067 | 3/2012 |

OTHER PUBLICATIONS

Alvarez et al., "Improving Oil Recovery in Unconventional Liquid Reservoirs by Soaking-Flowback Production Schedule with Surfactant Additives", Society of Petroleum Engineers, presented at the SPE Liquids-Rich Basins Conference, Midland, TX, Sep. 13-14, 2017, 18 pages.

(Continued)

*Primary Examiner* — William D Hutton, Jr.
*Assistant Examiner* — Ashish K Varma
(74) *Attorney, Agent, or Firm* — Kilpatrick Townsend & Stockton LLP

(57) ABSTRACT

Foaming formulations and methods and systems for using foaming formulations are disclosed. Concentric tubing can be positioned in a wellbore in a subterranean formation to position an exit orifice of the concentric tubing at a target zone. A foaming formulation can be injected through a first flow path of the concentric tubing and a blowing gas can be injected through a second flow path of the concentric tubing to maintain separation until the foaming formulation and the blowing gas exit the concentric tubing. Mixing of the foaming formulation and the blowing gas at the target zone can generate foam.

18 Claims, 8 Drawing Sheets

(56) References Cited

U.S. PATENT DOCUMENTS

| | | | |
|---|---|---|---|
| 9,951,264 B2* | 4/2018 | Penny | C09K 8/594 |
| 2007/0102156 A1* | 5/2007 | Nguyen | E21B 43/114 |
| | | | 166/280.2 |
| 2009/0114387 A1 | 5/2009 | Horvath Szabo et al. | |
| 2016/0084057 A1* | 3/2016 | Castro | E21B 43/26 |
| | | | 166/308.1 |
| 2018/0037792 A1* | 2/2018 | Champagne | C09K 8/52 |

OTHER PUBLICATIONS

Halliburton Energy Services, Inc , "Technical Bulletin: HC-2 Agent", Jan. 4, 2005, 6 pages.

Wang et al., "Simulation Studies on the Role of Lauryl Betaine in Modulating the Stability of AOS Surfactant-Stabilized Foams Used in Enhanced Oil Recovery", Energy & Fuels, 31, 2017, pp. 1512-1518.

Zhang et al., "Scaling for Wettability Aleration Induced by the Addition of Surfactants in Completion Fluids: Surfactant Selection for Optimum Performance", Unconventional Resources Technology Conference, Houston, TX, Jul 23-25, 2018, 17 pages.

Application No. PCT/US2019/055873 , International Search Report and Written Opinion, dated Jul. 7, 2020, 13 pages.

* cited by examiner

ENERGIZED NATURAL GAS FOAM DELIVERY DEVICES AND METHODS

TECHNICAL FIELD

The present disclosure relates generally to hydrocarbon production. More specifically, but not by way of limitation, this disclosure relates to foaming formulations and methods and devices for delivery of foam to a subterranean formation.

BACKGROUND

Well systems, such as oil or gas wells, for extracting fluids from a subterranean formation, can include a production well and an injection well. During production operations, various equipment, components, methods, or techniques can be used to displace and release hydrocarbon fluid (e.g., oil or natural gas) for recovery from formation. For example, a liquid solution can be injected into the formation to increase a mobility of the hydrocarbon fluid and sweep the hydrocarbon fluid within the formation towards the production well for enhanced oil recovery (EOR).

In some cases, foam may be injected in place of or addition to a liquid solution for EOR, such as to increase mobility of hydrocarbon fluids within the formation or for displacing or sweeping hydrocarbon fluids within the formation. Foam may be generated at the surface and then injected into a wellbore. Foams tend to have high viscosities and can involve high injection pressures due to drag on the injected foam as the foam travels down the wellbore, which can raise the energy requirements as compared to injection of liquid solutions. Foam degradation can also occur during transport down the wellbore, resulting in poor performance by the foam composition at the target production zone.

Attempts to generate foam in-situ within the wellbore at the target production zone, such as using WAG (Water Alternating Gas) methods, also suffer from poor performance, as the quality of the produced foams using WAG methods are difficult to control, such as if the fluids (i.e., water and gas) do not properly generate foam, for example because of the alternating injection scheme. Further, the injected fluids naturally flow to depleted/low pressure zones, which may not be where the foam is needed.

DETAILED DESCRIPTION

Figure 1:
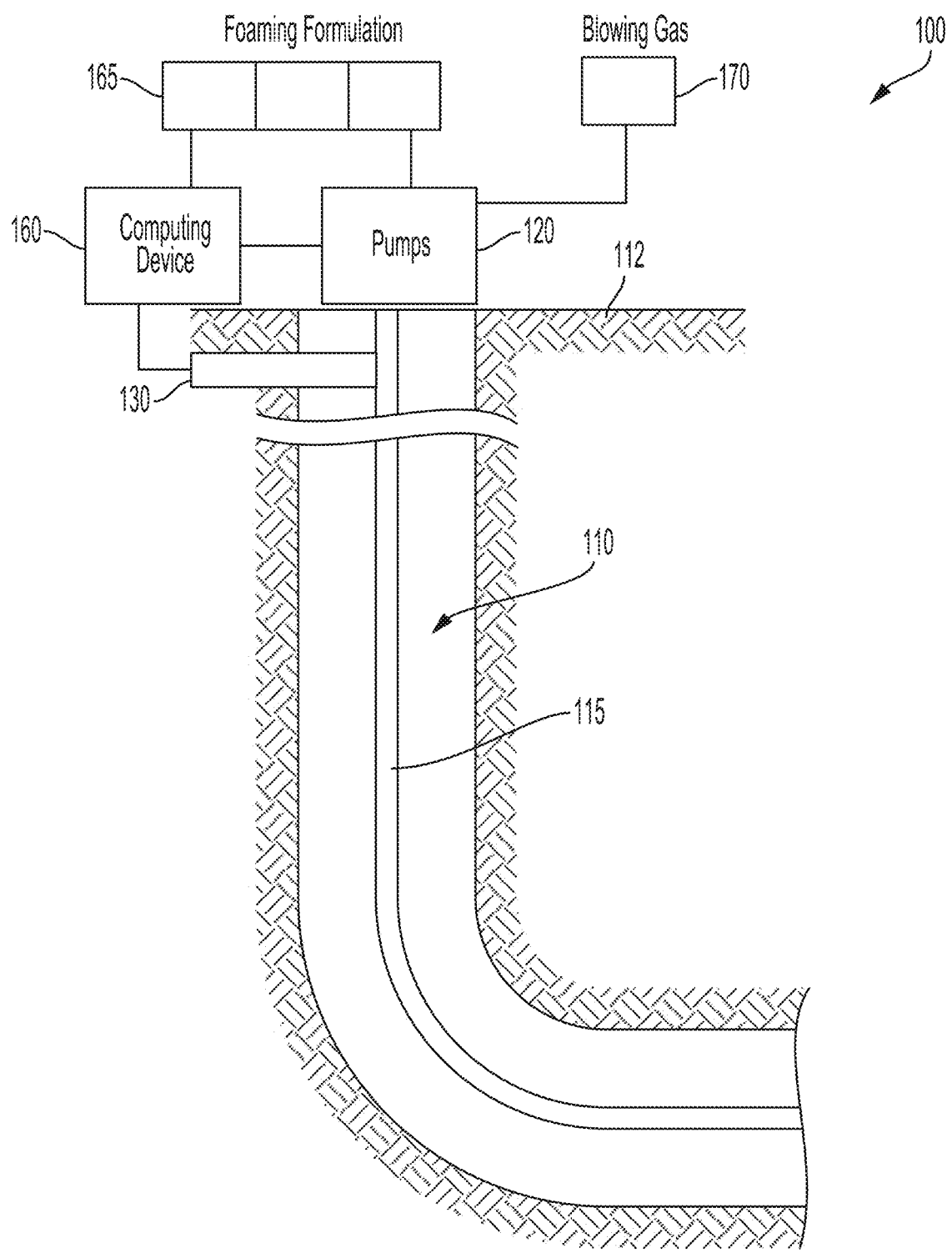
FIG. 1 is a cross-sectional view of an example of a well system including a wellbore in a formation according to some aspects of the disclosure.

Certain aspects and features relate to foaming formulations and methods and associated devices for use in combining a foaming formulation with a hydrocarbon-based blowing gas to generate foam in-situ in target production zones of a hydrocarbon formation. Typical foaming formulations are often unsuitable for use with hydrocarbon-based gases as the blowing gas, as some components of hydrocarbon-based gases can render the resultant foams unstable or otherwise prevent foam formation from occurring. For example, natural gas may contain methane, ethane, propane, butane, traces of longer chain hydrocarbon gases, as well as natural gas liquids of varying hydrocarbon lengths. In some cases, these or other natural gas components may behave as anti-foaming agents and cause the foam to quickly degrade or separate into the constituent liquid and gas components or otherwise prevent formation of a foam. The foaming formulations according to some aspects, however, generate stable foams when used with hydrocarbon-based blowing gases. The foaming formulations can employ a blend of surfactants, also referred to herein as foaming agents or foamers, and demulsifiers, also referred to herein as non-emulsifiers. The foaming formulations may also include an aqueous base fluid, such as water, fresh water, produced water, brine, and flowback fluids. In some cases, aqueous base fluids may contain minerals, salts, hydrocarbons, or viscosity modifying additives, such as guar, polyacrylamide, or cellulose-derived polymers.

The surfactants in the foaming formulations may be useful for generating foams by trapping pockets of the hydrocarbon-based blowing gas within a surround liquid film layer, similar to the use of soap for generation of suds. The surfactants may allow the large surface area interface between the liquid component and the hydrocarbon-based gas to be energetically stable, such as by altering the interfacial tension between the liquid component and the hydrocarbon-based gas comprising the foam (i.e., lowering the interfacial tension). For example, the interfacial tension value between the liquid component, lacking the surfactants, and the hydrocarbon-based gas may be higher than the interfacial tension value between the liquid component, including the surfactants, and the hydrocarbon-based gas.

The surfactants may also similarly lower the interfacial tension between the liquid component of the foaming formulation and other fluids, such as liquid hydrocarbons, like oil. Such an aspect may allow the foaming formulation to increase the mobility of the hydrocarbon fluids within a subterranean formation, such as by modifying the wettability of rock within the subterranean formation and or by changing its imbibition efficacy. In some cases, however, surfactants can serve to stabilize emulsions of oil and water, which may be undesirable.

Demulsifiers can be used to break emulsions or limit the formation of emulsions and can be included in the foaming formulations. The use of demulsifiers in foaming formulations may be complex. For example, if a demulsifier is not added to the foaming formulation, the resulting foam may be very stiff or viscous, and hydrocarbon extraction using the foam may be difficult, as the separation of the hydrocarbon from an aqueous liquid may be problematic. In some cases, if a demulsifier is added to the foam too early in the production process, the foam may break down or degrade preemptively, reducing the efficiency of production efforts. Demulsifiers included in the foaming formulations may improve the surfactant's efficiency in reducing the interfacial tension, aiding in modifying the wettability and imbibition efficacy and mobility of the hydrocarbon fluids in the subterranean formation.

Control over generating foam at a target production zone within a wellbore can be improved to, at least in part, overcome disadvantages of including demulsifiers in a foaming formulation. Such a configuration can limit the time between the generation of the foam and the interaction of the foam with the hydrocarbon fluid in the subterranean reservoir and limit the effects of having to pump the foam to where it is needed.

In some examples, a concentric tubing device, such as a concentric coiled tubing device, is used to deliver the hydrocarbon-based blowing gas and the foaming formulation directly within the wellbore, keeping hydrocarbon-based blowing gas and the foaming formulation separated along the length of the tubing conduit until mixing at exit orifices of the tubing to generate the foam. Generating foam through the delivery of the foaming formulation and hydrocarbon-based blowing gas via concentric tubing can avoid drawbacks of other processes. For example, by employing separately adjustable volumes of the hydrocarbon-based blowing gas and the foaming formulation, the gas volume fraction and quality of the foam can be controlled. Injecting foaming formulation that includes a surfactant and a demulsifier downhole enables localized generation of a foam that provides enhanced foam stability, low interfacial tension with various different oils, and provides enhanced emulsion break properties due to the addition of demulsifier in the formulation.

As another example, treating pressures can be lower, as the foam is not transported through the wellbore or within a conduit. Similarly, foam stability and premature degradation can be less concerning as the foam does not have travel for long distances or long times within the wellbore or a conduit. Additionally, using the concentric tubing for separate delivery of the foaming formulation and hydrocarbon-based blowing gas, the fluid path can be controlled because the foam can be delivered directly where it is desired. Optionally, packers can be used within the wellbore above and below the zone of interest to limit movement of the foam.

The foaming formulations enable stable foam generation, oil mobility enhancement, and contact angle, wettability, and imbibition efficacy alteration. The formulation can be or comprise a foamer having a surfactant blend that can provide excellent foam stability, fast emulsion break time, low interfacial tension (e.g., 1-10 mN/m) and significant surface wettability alteration properties (>40° contact angle change). Unlike some foamers that only perform using $CO_2$, nitrogen, or inert gases as the blowing gas, the present foaming formulations can produce foam using methane or natural gas as the blowing gas. For example, the foaming formulations may be used in Enhanced Oil Recovery (EOR) operations that utilize methane or other hydrocarbon-based gases. In some cases, a combination of an inert gas and a hydrocarbon gas, like natural gas or a component thereof, is used as the blowing gas. Optionally, the inert gas and hydrocarbon gas are mixed or used sequentially during generation of foam.

Useful foaming formulations may optionally comprise a surfactant or surfactant blend, which may include one or more anionic surfactants, amphoteric surfactants, or nonionic surfactants and optionally other components, such as salts, organic compounds, stabilizers, etc. Useful foaming formulations may optionally comprise a demulsifier blend, which may include one or more alcohols, polyalcohols, polyamines, polyamine polyethers, resin alkoxylated oligomers, alkyphenols, alkylphenol derivatives, alkylphenol ethoxylates, or alkylphenol ethoxylate derivatives and optionally other components, such as salts, organic compounds, stabilizers, etc.

One example of a foaming formulation includes an alpha olefin sulfonate, cocoamidopropyl betaine, and a nonylphenol ethoxylate resin. Such a formulation can provide high foam stability in the presence of certain blowing gases such as methane or natural gas.

I. Systems for Foam-Based Hydrocarbon Production Processes

FIG. 1 is a cross-sectional view of an example of a well system 100 including a well 110 in a formation 112. A length of concentric tubing 115 is deployed in well 110 and can be used to inject a foaming formulation, a blowing gas, or other fluid materials into the formation 112. The well system 100 can be used to carry out foam-based hydrocarbon production methods. The concentric tubing 115 may be coiled at the surface (not shown in FIG. 1) on a tubing reel for storage and ease of transport down the well 110. In some cases, concentric tubing used with a coiled configuration may be referred to as concentric coiled tubing.

In a foam-based production process, foam is used to aid production of hydrocarbons from the formation 112, such as by displacing the hydrocarbons or increasing the mobility of the hydrocarbons and is generated by combining two phases (i.e., a liquid phase and a gas phase), at a target production zone within well 110. As part of the liquid phase, surfactants are used to maintain the stability of the foam, by lowering the interfacial tension between the gas phase and making the gas/liquid interface more energetically stable. Over time, the generated foam may begin to degrade, such as due in part to the interaction with hydrocarbons in the formation 112. A demulsifier is present as part of the liquid phase and is used to limit the creation of an oleic/aqueous emulsion, where small droplets of aqueous phase liquid are dispersed in the oil phase or where small droplets of oil phase liquid are present in the aqueous phase. By limiting the creation of an emulsion, separate distinct oleic and aqueous phases can be maintained, providing easier production of hydrocarbons. The surfactant can also modify the wettability of rock within the formation, such as by changing the rock surfaces to a more water wet condition, which allows for easier release of the hydrocarbons from within pores of the rock. In some cases, absorption of surfactant blend into the rock pores of the formation 112 can reduce interfacial tension between rock pores and reduce the pressure gradient within the target production zone, which can, in turn, make it easier for hydrocarbons to be extracted from the target production zone.

The foaming formulation and blowing gas may be injected to the desired location of the formation 112, such as a target production zone, by pumping the foaming formulation and blowing gas into tubing 115 using pumping equipment 120, which may comprise individual pumps for separately pumping foaming formulation and blowing gas. For example, exit orifices of the tubing 115 can be aligned with or guided to a desired location or target production zone within the formation 112 to localize the foaming formulation and blowing gas delivery and the generation of foam. The foaming formulation may comprise, for example, an aqueous mixture of one or more surfactant and one or more demulsifiers that, when combined with the blowing gas, results in the generation of foam at the target production zone. In embodiments, the blowing gas may comprise natural gas or a gas phase hydrocarbon. Locations for mixing the foaming formulation and the blowing gas can include a perforation or entrance to a target production zone. Generating the foam directly at the perforation or otherwise at a target production zone can reduce the impact of resultant foam viscosity on the efficiency of production, as the foam is not needed to be pumped along the length of concentric tubing 115. Eliminating the pumping of foam along the length of concentric tubing 115 can also reduce the time between the foam generation and the contact with the hydrocarbons in the formation 112.

In some examples, the concentric tubing 115 can have at least one inner ring of tubing nested within the outer length of conduit. The inner ring of the concentric tubing 115 can carry the blowing gas, while the outer ring can transport the foaming formulation. Alternatively, the inner ring of the concentric tubing 115 can carry the foaming formulation, while the outer ring can transport the blowing gas. When the fluid (e.g., natural gas) in the inner ring of the concentric tubing 115 passes through an exit orifice of the concentric tubing 115 positioned near a perforation or target production zone of formation 112, it may pass through the fluid (e.g., liquid foaming formulation) in the outer ring of the concentric tubing 115, beginning the process that generates foam. As the blowing gas and the foaming fluids contact one another and mix in the target production zone of the formation 112, foam is created. Because the foaming formulation described herein is capable of producing foam in the presence of hydrocarbon fluids and gases, the blowing gas can be hydrocarbon gas (e.g., natural gas). For example, a resulting foam can include pockets or bubbles of natural gas surrounded by a film of the aqueous fluid (e.g., water mixed with surfactant/demulsifier blend).

The foaming formulation may have ingredient percentages that vary proportional to one another, which can be varied to modify the produced foam's viscosity and to accommodate the well pressure at the target production zone. In some aspects, a computing device 160 can dynamically produce the foaming formulation by controlling valves releasing different pre-blended foaming formulations or different foaming formulation components (e.g., aqueous base fluids, surfactants, demulsifiers) from reservoirs 165 or by controlling pumps 120 controlling the flow of different foaming formulation components. Computing device 160 can, in some aspects, increase or decrease the pumping rates of the foaming formulation components from reservoirs 165 or blowing gas from tank 170 to control the volume and quality of foam generated downhole. For example, the computing device 160 can operate pumps 120 to pump foaming formulation and blowing gas into the well 110, via concentric tubing 115. The computing device 160 can record changing pressure values at or near the surface using one or more pressure sensors 130 and downhole pressure using sensors deployed within the well 110. Recording pressure values over time after a foaming formulation and blowing gas injection and the resultant generation of foam can produce a measurement of an onset of downhole pressure, which can be analyzed to determine how the foaming formulation and blowing gas injection and foam generation is affecting the wellbore and its environment. In some cases, pressure measurements from pressure sensors 130 and downhole sensors may be used in a feedback scheme to modify the ratios of the different foaming formulation components, the total flow rate of the foaming formulation, or the flow rate of the blowing gas in real time to control the generation of foam within formation 112. Generation of foam within formation 112 may be a continuous process or be performed in batches, where additional foaming formulation and blowing gas injections can be initiated by the computing device 110 to repressurize or increase the pressure within the well system 100. Well 110 can include horizontal sections. In some examples, generating foam can increase a pressure within well 110 or formation 112. In some aspects, the use of generated foam to repressurize wells can be used across parent and child wells within formation 112.

Various aspects of the concentric tubing device and foaming formulation injection methods can be used in any foam-based hydrocarbon production process. For example, foam generation may be used in enhanced oil recovery (EOR), fracturing (fracking), huff and puff, etc.

II. Foaming Formulations for Generating Stable, Downhole Foam

Foam generation may be used in a variety of hydrocarbon production processes to increase production efficiency. The foaming formulations of the present disclosure are well suited for downhole or in-formation generation of stable foams. In certain aspects, the foaming formulation comprises an anionic surfactant (also referred to as an anionic foamer), an amphoteric surfactant (also referred to as an amphoteric foamer or a zwitterionic surfactant or foamer), and a non-ionic demulsifier (also referred to as a non-ionic non-emulsifier). In other aspects, the foaming formulation comprises an amphoteric surfactant and a non-ionic demulsifier. In other aspects, the foaming formulation comprises an amphoteric surfactant and a cationic demulsifier (also referred to as a cationic non-emulsifier).

A foam generated using a blend of surfactants, aqueous fluids, and blowing gas may exhibit properties suitable for foam-based hydrocarbon production. However, this combination alone may not provide a good emulsion break profile because foaming surfactant formulations may stabilize the interphase between two immiscible phases (i.e., oil and water), which may result in formation of an emulsion. In an emulsion, the two immiscible phases can form a mixture of a dispersed phase (in droplet form) within a continuous phase. This can be an emulsion of oil dispersed in water or an emulsion of water dispersed in oil. In either case, droplets of the dispersed phase are surrounded by the continuous phase and natural settling, coalescence, and separation of the two immiscible phases can take significant time, resulting in oil contaminated produced water or water contaminated produced oil. To address this problem, a demulsifier may be included in the foaming formulation, which can accelerate the coalescence or separation of the immiscible phases, or, in some cases, prevent or reduce formation of an emulsion. Adding demulsifier to the foaming formulation can improve the demulsifying properties of the foaming formulation and reduce interfacial tension that can be beneficial to oil displacement in the formation and improve oil mobility and alter wettability, in addition to enhancing emulsion break time.

Natural gas passed through the inner ring of the concentric tubing 115 and mixed with the foaming formulation downhole can be a variable mixture of hydrocarbon and inert gases. Natural gas commonly contains methane, ethane, propane, butane, traces of longer chain hydrocarbons, and non-hydrocarbon gases such as carbon dioxide and nitrogen. Natural gas may also contain natural gas liquids of varying hydrocarbon lengths, depending on the source reservoir characteristics or gas plant separation efficacy. The exact concentration of these aforementioned species in the blowing gas can vary.

Aqueous fluids included the foaming formulation or in the generated foam can include but are not limited to: fresh water, produced water, brine, and flow back fluids. The aqueous fluids may be present downhole within a target production zone or may be added to the foaming formulation and passed within the outer ring of the tubing 115 into the formation 112. They may contain a varying degree of minerals and salts, stability or performance additives, such as nanoparticles or polymers, as well as a varying degree of hydrocarbons. They also may contain other additives that can modify the viscosity of the fluid or the resultant foam, which include but are not limited to: guar, polyacrylamide, and cellulose-derived polymers.

Surfactants included in the foaming formulation may include, but are not limited to, an anionic surfactant, an amphoteric surfactant, or combinations of these. Example anionic surfactants include sulfate surfactants, sulfonate surfactants, phosphate surfactants, and carboxylate surfactants. Useful anionic surfactants include, but are not limited to, organosulfates, alkyl sulfates, sulfate esters of ethoxylated fatty alcohols, alpha olefin sulfonates, or alkyl benzene sulfonates. Anionic surfactants may optionally be referred to or present in their salt form, such as including counterions such as sodium or magnesium. Example amphoteric surfactants may include those comprising a cationic component and an anionic component. Useful anionic components may include, but are not limited to, sulfates, sulfonates, phosphates, or carboxylates. Useful cationic components include, but are not limited to, a primary amine, a secondary amine, a tertiary amine, a quaternary ammonium cation. Example amphoteric surfactants include betaines, which may include a quaternary ammonium cation ($NR_4^+$) and a carboxylate anion ($RCO_2^-$). A number of useful surfactants may be derived from palm kernel oil, coconut oils, fatty alcohols (e.g., dodecanol), such as cocoamidopropyl betaine, sodium lauryl sulfate, sodium lauryl ether sulfate. Useful surfactants may include a carbon chain or tail having from 8 to 18 carbon atoms, for example, in addition to an anionic component. In some embodiments, a surfactant blend comprises anionic foamers, such as alpha olefin sulfonates, amphoteric surfactants, such as betaines, non-ionic non-emulsifying surfactants that are derived from ethoxylated glycerides, ethoxylated sorbitan esters, ethoxylated alcohols, or cationic surfactants. In some embodiments, cationic surfactants may exhibit a complimentary electrostatic interaction with negatively charged particles/proppant.

Demulsifiers, also referred to as non-emulsifiers, may be useful in the foaming formulations described herein. In some examples, demulsifiers may be or comprise nonionic compounds. For example, demulsifiers may comprise alkyphenols or alkylphenol ethoxylates or derivatives of these. An example alkylphenol is nonylphenol and an example alkylphenol ethoxylate is nonylphenol ethoxylate. Alkyphenols and alkylphenol ethoxylates may be components or precursors of phenolic resins, for example, which may be useful as demulsifiers in some embodiments. Example demulsifiers useful with the foaming formulations described herein include, but are not limited to, phenolic resins, ethoxylated phenolic resins, epoxy resins, ethoxylated epoxy resins, polytheyleneimines, ethoyxlated polytheyleneimines, polyamines, ethoxylated polyamines, polyols, ethoxylated polyols, diepoxides, ethoxylated diepoxides, resin alkoxylates, amine alkoxylates, polyethyleneimine alkoxylates, ethyleneoxidepropyleneoxide block copolymers, or any combinations of these. A specific example demulsifier is nonylphenol ethoxylate resin. Demulsifiers useful in the foaming formulations may optionally comprise an aqueous base fluid, an alcohol, a resin alkoxylated oligomer, a polyol; and a polyamine polyether. Examples of resin alxoylated oligomers include, but are not limited to, phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, or any combinations of these. Examples of polyols include, but are not limited to, polyoxyalkylene glycol, a polyol block copolymer, or any combinations of these. Examples of polyamine polyethers include, but are not limited to, amine oxyalkylates, alkoxylated polyamines, amine-initiated polyol block copolymers, ethylenediamine ethoxylated polyethyleneimine polymers, ethylenediamine propoxylated polyethyleneimine polymers, or any combinations of these.

The foaming formulation may optionally lack or be free of certain compounds or compositions, such as compositions that may exhibit deleterious environmental impacts or that may impact the ability of a demulsifier to separate an emulsion or that may impact the foaming capability of a surfactant. Optionally, the foaming formulation is free of or does not comprise or include nonylphenol ethoxylates, alkyl phenol ethoxylates, or bisphenol A. Optionally, the foaming formulation is free of or does not comprise or include non-alcoholic solvents or non-aqueous solvents or non-aqueous base fluids. For example, the foaming formulation is optionally free of or optionally does not comprise or include aromatic solvents such as toluene, xylene, etc.; aromatic petroleum naphtha such as heavy aromatic petroleum naphtha (CAS No. 64742-94-5), light aromatic petroleum naphtha (CAS No. 64742-95-6), etc.; branched and linear dibasic ethers such as dimethyl 2-methylglutarate; trimethyl citrate; turpentine; terpenes such as ethyl lactate, d-limonene, dipentene, citrus, orange, etc.; castor oil ethoxylates; 9-decenoate methyl ester; propylene glycol propyl ether; propylene glycol butyl ether; N-methyl-pyrrolidone; N-octyl-2-pyrrolidinone; 1-dodecyl-2-pyrrolidinone; N,Ndimethyl-9-decenamide; acetic ester of monoglycerides; diethyl carbonate; hydrocarbon distillates (C7-C28); or any combinations thereof.

In some examples, a foaming formulation comprises one or more of an alpha olefin sulfonate salt of an aliphatic acid, cocamidopropyl betaine, a nonylphenol ethoxylate, 2-butoxyethanol (also referred to as butyl cellosolve or ethylene glycol monobutyl ether), nonylphenol formaldehyde resin, ethanol, aromatic hydrocarbons, or glutaraldehyde.

Certain aspects may include foaming formulations having various concentrations (e.g., relative concentrations) of surfactants and demulsifiers. As examples, the total relative demulsifier fraction (i.e., wt. % based on a total weight of the one or more surfactants and the one or more demulsifiers in the foaming formulation) can optionally be from about 5% to about 20%, such as 5%, 6%, 7%, 8%, 9%, 10%, 11%, 12%, 13%, 14%, 15%, 16%, 17%, 18%, 19% or 20%. The total relative surfactant fraction (i.e., wt. % based on a total weight of the one or more surfactants and the one or more demulsifiers in the foaming formulation) can optionally be from about 80% to about 95%, such as 80%, 81%, 82%, 83%, 84%, 85%, 86%, 87%, 88%, 89%, 90%, 91%, 92%, 93%, 94%, or 95%. The surfactant may include multiple different surfactants species or surface-active suspending agents, for example, or may be provided as a surfactant blend comprising one or more surfactant species and one or more additives.

The demulsifier may include multiple different demulsifier species, for example, or may be provided as a demulsifier blend comprising one or more demulsifier species and one or more additives. A relative fraction (wt. %) of a surface-active suspending agent, which may be or comprise an amphoteric surfactant, for example, can optionally be from about 20% to about 60%. A relative fraction (wt. %) of an anionic surfactant can optionally be between about 30% and about 70%. These percentages may represent relative amounts of surfactants and demulsifiers before mixing with an aqueous solution.

The use of the foaming formulation may provide the ability to generate foam within a formation using natural gas as a blowing gas. The foaming formulation may optionally provide a higher foam stability than foam produced with traditional surfactants. The foaming formulation may optionally provide higher surfactant efficacy. The foaming formulation and the resultant foam may optionally provide improved wettability alteration and imbibition efficacy. The foaming formulation may optionally provide higher foam stability in the presence of oil or other hydrocarbons. The foaming formulation may optionally provide higher foam stability at higher temperatures. The foaming formulation may optionally provide higher foam stability in the presence of salts/produced water. These aspects may help maintain foam performance within a target production zone, enabling surfactant transmission or absorption into the rock, or sweeping or displacement of hydrocarbons within the formation. In some cases, the surfactant can reduces interfacial surface tension between the downhole hydrocarbon material (e.g., oil, gas, natural gas) and the rock of the formation. This reduced interfacial tension can allow for easier extraction of the hydrocarbon material from the formation as the material can flow more smoothly, and with less drag, from rock pores of the formation.

The foaming formulation may optionally comprise from about 0.1 wt. % to about 30 wt. % (based on the total weight of the foam) of surfactants, from about 0.1 wt. % to about 20 wt. % (based on the total weight of the foam) of demulsifiers, and from about 40 wt. % to about 80 wt. % (based on the total weight of the foam) of the aqueous base fluid. The resultant foam may optionally comprise, for example, from about 10 vol. % to about 90 vol. % (based on the total volume of the foam) of blowing gas, from about 0.1 wt. % to about 30 wt. % (based on the total weight of the foam) of surfactants, from about 0.1 wt. % to about 20 wt. % (based on the total weight of the foam) of demulsifiers, and from about 40 wt. % to about 80 wt. % (based on the total weight of the foam) of the aqueous base fluid. The surfactants may optionally comprise 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, or 30 wt. % of the foaming formulation or the resultant foam. The demulsifiers may optionally comprise 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, or 20 wt. % of the foaming formulation or the resultant foam. The aqueous base fluid may optionally comprise 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. %, 55 wt. %, 56 wt. %, 57 wt. %, 58 wt. %, 59 wt. %, 60 wt. %, 61 wt. %, 62 wt. %, 63 wt. %, 64 wt. %, 65 wt. %, 66 wt. %, 67 wt. %, 68 wt. %, 69 wt. %, 70 wt. %, 71 wt. %, 72 wt. %, 73 wt. %, 74 wt. %, 75 wt. %, 76 wt. %, 77 wt. %, 78 wt. %, 79 wt. %, or 80 wt. % of the foaming formulation or the resultant foam. In some cases, the foaming formulation may be pre-blended or the foaming formulation may be blended on the fly in real time from the constituent components (e.g., aqueous base fluids, surfactants, demulsifiers) as it is needed for use in foam generation.

III. Concentric Tubing Delivery System

Figure 2A:
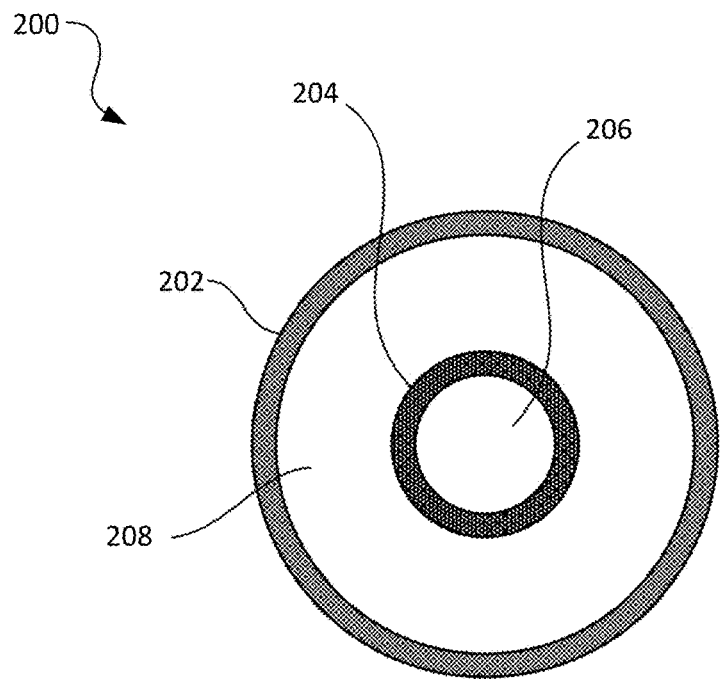
FIG. 2A and FIG. 2B provide schematic illustrations of an example of concentric tubing for delivery of fluids into a well system according to some aspects of the present disclosure.
Figure 2B:
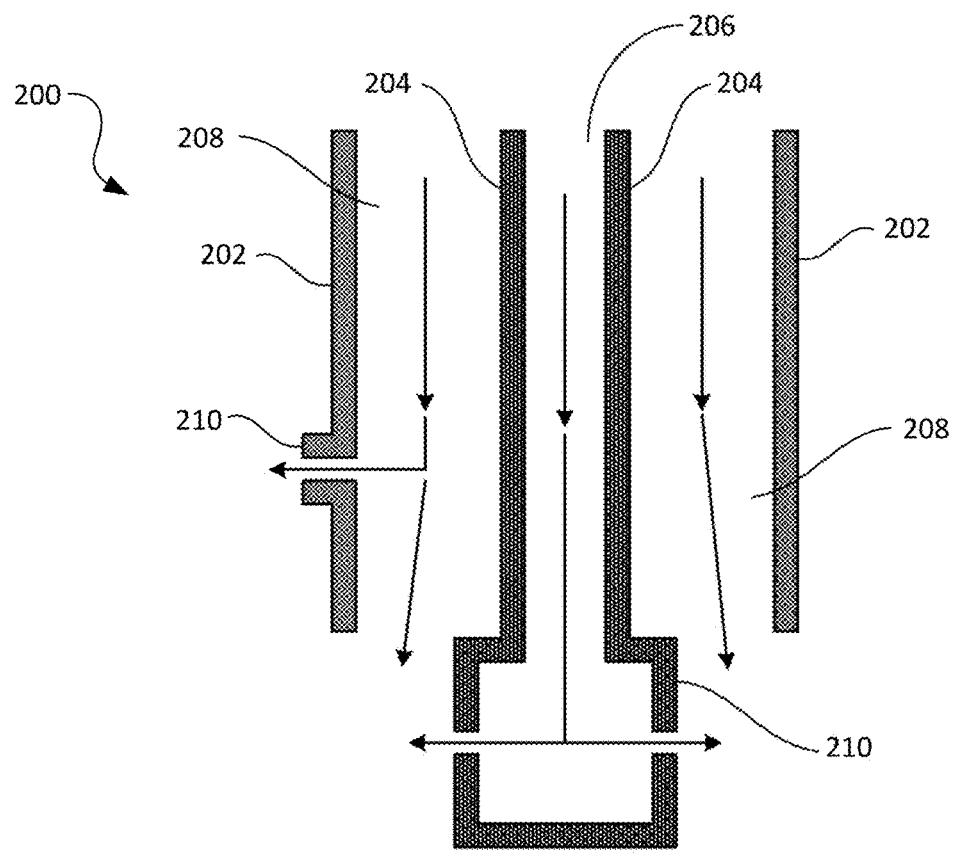

FIG. 2A shows a top or end cross-sectional view of an example concentric tubing 200 for delivery of fluids and gases into a well system according to certain aspects and FIG. 2B shows a side cross-sectional view of another example concentric tubing 200. The concentric tubing 200 (e.g., tubing 115) can be a tool of well system 100 used to deliver or recover agents downhole during hydrocarbon production. The concentric tubing 200 has an outer ring 202 of tubing and at least one inner ring 204 lying concentric to or nested within the outer ring 202.

The concentric tubing 200 has a first flow path 206 within the inner ring 204 and a second flow path 208 between the exterior of the inner ring 204 and the interior of the outer ring 202. Although the inner ring 204 and outer ring 202 are shown in a nested configuration, other configurations of concentric or parallel flow paths 206, 208 may be used, such as side-by-side configurations. Although configuration of the two flow paths 206, 208 may impact the flow of materials through the concentric tubing 200, the configuration should be such that both flow paths 206, 208 are separate and distinct from one another and allow for delivery of materials from both flow paths 206, 208 at the same location to allow mixing and foam generation. Materials such as liquids and gases can be pumped through one or both of the flow paths 206, 208 of the concentric tubing 200 into a well. Pumping of fluids through the concentric tubing 200 may be carried out using pumps 120 of well system 100 and optionally controlled by computing device 160, which may monitor or control pressure, volume, flowrate, or the like of materials injected downhole.

Each of the first and second flow path can terminate at exit orifices at the end of the concentric tubing 200. In some examples, the wall defining the boundary of one flow path can be slightly recessed from a wall defining the boundary of the other flow path near an exit orifice. This may allow for some bleed between flow paths and enable mixing of the contents of the flow paths. In some examples, there may be exit orifices, such as valves or nozzles, along the concentric tubing's length. Having multiple exit orifices may enable controlled release of foaming agents to target areas within a hydrocarbon production formation. In some embodiments, an exit orifice enabling expulsion of the contents of both flow paths can be available at the termination of the concentric tubing 200.

The concentric tubing 200 can be used to enable various production processes. For example, a foaming formulation and a blowing gas can be transported through the concentric tubing 200 into a target production zone to aid in production of oil or gas. The foaming formulation can be pumped down either flow path, as can the blowing gas, and mixed near an exit orifice of the concentric tubing 200. The resultant foam can be used as a fracturing foam, as in a fracturing process, or a means of improving hydrocarbon fluid extraction in EOR processes.

When it is pumped into a target production zone, the foaming formulation mixes with the blowing gas carried within the concentric tubing 200 to generate foam. The blowing gas and foaming formulation can be pumped in either section of the concentric tubing 200. The two phases are fully separated during transport. Mixing the two fluids can occur through the pressure gradient or be assisted by a jetting mechanism within the concentric tubing 200. For example, the fluids can be mixed by the pressure exerted on the contents of the inner ring 204 passing through the contents of the outer ring 202. In some examples, the concentric tubing 200 can include one or more jets 210, also referred to as nozzles or jetting tools, positioned within the concentric tubing or near an exit of the concentric tubing to create turbulence within the fluid flow as the fluids mix. Such a configuration may be useful for improving the foam degradation rate as compared to traditional foam transport methods. Additional details of example jets, nozzles, and jetting tools can be found in U.S. Pat. No. 5,765,642 and U.S. Patent Application Publication No. 2007/0102156, which are hereby incorporated by reference.

In certain aspects, two phases of fluid (blowing and liquid) are pumped through the concentric tubing 200. The concentric tubing 200 can be positioned down the well such that at least one exit orifice of the tubing is near the perforation of a target production zone. Packers can isolate the perforations/zone of interest. The two different phases of fluid and gas can be fully separated just prior to the target production zone. In certain embodiments, the foaming formulation and the blowing gas can mix in the annulus between the inner ring 204 and outer ring. In other embodiments, the foaming formulation and the blowing gas can mix between the concentric tubing 200 and casing outside of the entry point (perforations, etc.). The volume fraction or quality of foam can be precisely controlled by changing the flow rate of one or both the foaming formulation or the blowing gas. After the treatment for the target zone is completed, the concentric tubing 200 can be moved to a different zone, where the process can repeat until the well has been fully treated. In this manner, foam can be delivered to target zones with a production formation quickly and efficiently.

One or more jets 210 can be positioned within or external to exit orifices of the concentric tubing 200. The jets 210 can force fluid at pressure, generating turbulence and mixing the fluids. In some examples, the jets 210 can be positioned within the outer ring 202. The jets 210 can also be positioned external to the outer ring 202. In some examples, jets 210 can be positioned in both internal and external locations with reference to the outer ring 202.

Modifying the size of the exit orifice of the concentric tubing 200 can change the granularity of produced foam. For example, smaller exit orifices can produce a foam having smaller granularity, while exit orifices of larger size may produce larger granularities of foams. Choke size of the exit orifice depends on velocity at which the foam is pumped. Choke sizes may range from $4/64''$ to $56/64''$ in $1/64''$ increments, for example.

IV. Methods of Generating Foam

Figure 3:
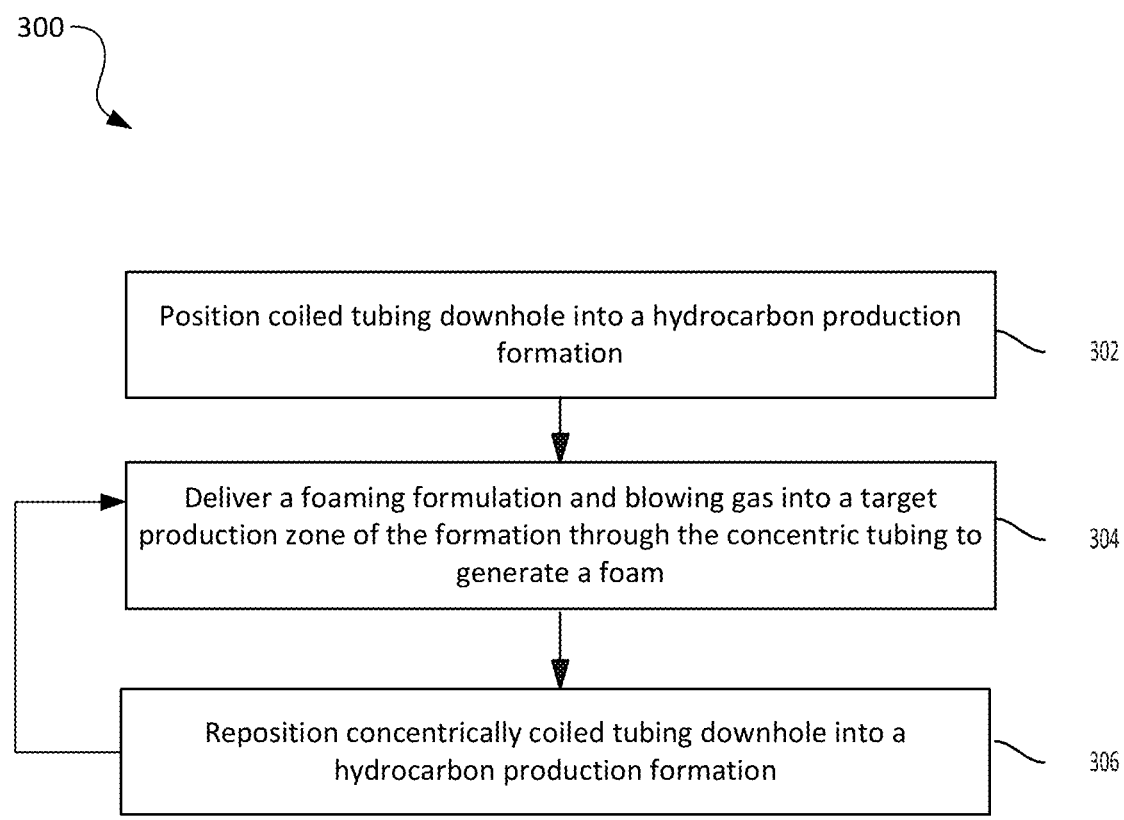
FIG. 3 is a flowchart providing an overview of an example of a process for generating foam according to some aspects of the present disclosure.

FIG. 3 is a flowchart illustrating an example process 300 for generating foam by injecting a foaming formulation and a blowing gas (e.g., natural gas) into a well system according some aspects. The process 300 is carried out in some aspects by an operator or computing device associated with well system tools. At block 302 of process 300, concentric tubing is positioned downhole into a hydrocarbon production formation. The concentric tubing can be concentric tubing as described with reference to FIG. 2A and FIG. 2B, or some other form of tubing. However, foam generation may be less consistent with other forms of tubing. Foam generation can be performed by mixing the foaming formulation and the blowing gas within a production zone of a formation. In some examples, foam generation can be performed to pressurize or repressurize the well system after a round of production. For example, pressure within the well system may change after substantial production occurs. Foam can be generated downhole to stabilize the pressure within the well system after such production.

At block 304, the foaming formulation and the blowing gas are delivered into a target production zone of the hydrocarbon production formation through the concentric tubing to generate a foam. This delivery can include running natural gas as the blowing gas through an inner ring of the concentric tubing and the foaming formulation through the outer ring of the concentric tubing such that the natural gas must pass through the fluid at the exit of the concentric tubing. The foaming formulation may comprise an aqueous fluid. Introduction of the foaming formulation to the natural gas can generate a stable foam within the well system. The computing device can modify a pump velocity of the well system to alter a volume of the generated foam. After a determined period of time, which may allow surfactant within the foam to contact hydrocarbons and rock in the production zone, a pump can be used to produce hydrocarbons fluid from the production zone.

At block 306, the concentric tubing can be repositioned to a second target zone within the production formation. The process 300 can then repeat beginning at block 302, to deliver additional foam into the well system.

Figure 4:
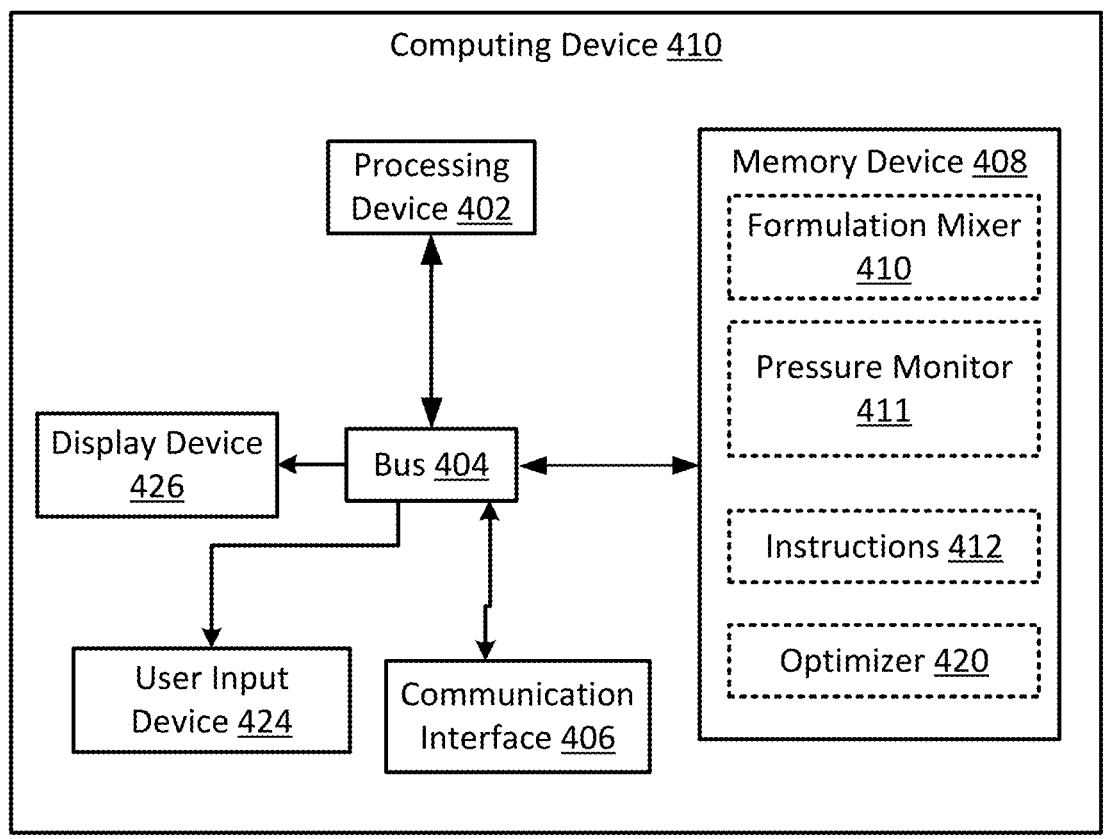
FIG. 4 is block diagram of an example of a computing device for controlling a well system pumping operation according to some aspects of the present disclosure.

FIG. 4 depicts an example of a computing device 410. The computing device 410 can include a processing device 402, a bus 404, a communication interface 406, a memory device 405, a user input device 424, and a display device 426. In some examples, some or all of the components shown in FIG. 4 can be integrated into a single structure, such as a single housing. In other examples, some or all of the components shown in FIG. 4 can be distributed (e.g., in separate housings) and in communication with each other.

The processing device 402 can execute one or more operations that result in the generation of foam downhole within a well system and subsequent production of hydrocarbons. The processing device 402 can execute instructions stored in the memory device 408 to perform the operations. The processing device 402 can include one processing device or multiple processing devices. Non-limiting examples of the processing device 402 include a field-programmable gate array ("FPGA"), an application-specific integrated circuit ("ASIC"), a microprocessing device, etc.

The processing device 402 can be communicatively coupled to the memory device 408 via the bus 404. The memory device 408 may include a non-volatile memory device or any type of memory device that retains stored information when powered off. Non-limiting examples of the memory device 408 include electrically erasable and programmable read-only memory ("EEPROM"), flash memory, or any other type of non-volatile memory. In some examples, at least some of the memory device 408 can include a non-transitory computer-readable medium from which the processing device 402 can read instructions. A computer-readable medium can include electronic, optical, magnetic, or other storage devices capable of providing the processing device 402 with computer-readable instructions or other program code. Non-limiting examples of a computer-readable medium include (but are not limited to)

magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In this example, the memory device 408 includes various subroutines, programs, or other data or instructions. For example, memory device includes formulation mixer 410, which may provide recipe and proportion information for the foaming formulation to be used by the computing device in controlling proportions of different foaming formulation components. The memory device 408 in this example also includes pressure monitor 411, which may be used to monitor pressure changes within the production environment that can be accessed and used to continuously determine or evaluate pressure changes. In this example, the memory device 408 includes other computer program instructions 412, such as for acquiring downhole data and controlling pump 120, movement and positioning of the concentric tubing, and foaming formulation reservoir 115. The memory device 408 in this example also includes optimizer 420, which can be used to monitor or evaluate the production goals and monitored pressure to optimize foaming formulation and production of hydrocarbons.

The computing device 410 includes a communication interface 406 enabling communication with other computing devices. In some examples, the computing device 410 includes a user input device 424. The user input device 424 can represent one or more components used to input data. Examples of the user input device 424 can include a keyboard, mouse, touchpad, button, or touch-screen display, etc. In some examples, the computing device 410 includes a display device 426. The display device 426 can represent one or more components used to output data.

V. Example Foaming Formulation Characteristics

The foaming formulation can have ingredients present in varying proportion to one another. Flexibility in the formulation is desirable to enable modification of the foaming formulation for different purposes, such as to increase foam stability or increase foam degradation speed. In some cases, the foaming formulation can be modified in real time (i.e., on the fly during foam production) by controlling the proportions of various components of the foaming formulation. The composition of the foaming formulation may be modified, for example, based on downhole pressure measurements, which may provide an indication of the quality or stability of the foam.

The foaming formulations may be useful for enhancing production of oil having an API (American Petroleum Institute) gravity of from 20 to 43, for example.

Several examples of different foaming formulations useful for generating foam are shown in Table 1. These foaming formulations include one or more surfactants and one or more demulsifiers. The surfactants may optionally include both an amphoteric surfactant blend and an anionic surfactant blend in proportional amounts. In the examples tested herein, a combination of a first surfactant blend ("Surfactant 1") and a second surfactant blend ("Surfactant 2") was used. Surfactant 1 comprises, among others, cocamidopropyl betaine. Surfactant 2 comprises, among others, an alpha olefin sulfonate, diethylene glycol, and ethylene glycol monobutyl ether. Solvent-based demulsifiers may be included, such as those that contain alcohols, resin alcoxylate surfactants, polyether polyamine, and polyols. Table 1 shows three example foaming formulations, identified as Formulation 1, 2, and 3, and their respective percentages of Surfactant 1, Surfactant 2, and a demulsifier. Two demulsifiers blends were tested, referred to herein as Demulsifier 1 and Demulsifier 2, as indicated in Table 1. Demulsifier 1 comprises, among others, isopropanol, commercially available alkoxylated phenol resin demulsifiers from BASF SE (Basorol 9429 and Basorol 9954), a commercially available polyamine polyether demulsifier from KMCO, LLC (KB-1410, an oxyalkylated amine), and a commercially available polyol demulsifier from KMCO, LLC (KB-1303). Demulsifier 2 comprises, among others, isopropanol, commercially available alkoxylated phenol resin demulsifiers from BASF SE (Basorol 9429 and Basorol 9954), a commercially available polyamine polyether demulsifier from KMCO, LLC (KB-1410, an oxyalkylated amine), and a commercially available polyol demulsifier from Solvay S.A. (Clearbreak 195). These foaming formulations were used to generate the results described with reference to FIGS. 5-8. The results are examples and may vary depending on the exact composition of the foaming formulation used and the composition of the hydrocarbons.

TABLE 1

| Formulation # | Surfactant 1 (wt. %) | Surfactant 2 (wt. %) | Demulsifier 1 (wt. %) | Demulsifier 2 (wt. %) |
| --- | --- | --- | --- | --- |
| 1 | 34 | 52 | 14 | 0 |
| 2 | 34 | 52 | 0 | 14 |
| 3 | 80 | 10 | 10 | 0 |

An analysis of crude oil saturation area, aromatics area, resins area, and asphaltenes area (SARA) was performed on multiple crude oils exposed to the foaming formulation, with the results provided in Table 2. The SARA analysis was performed on the Delaware basin crude oil and on Gulf of Mexico crude oil. Delaware basin oil was used for interfacial tension testing as described with reference to FIG. 5 and for emulsion break testing as described with reference to FIG. 7, and Gulf of Mexico oil was used for emulsion break test as described with reference to FIG. 6.

TABLE 2

| Crude Oil Source | API Gravity | Saturation Area % | Aromatics Area % | Resins Area % | Asphaltenes Area % |
| --- | --- | --- | --- | --- | --- |
| Delaware basin | 41.6 | 83.3 | 15 | 1.7 | ND |
| Gulf of Mexico | 28.6 | 27.8 | 49.8 | 10.4 | 12.1 |

Figure 5:
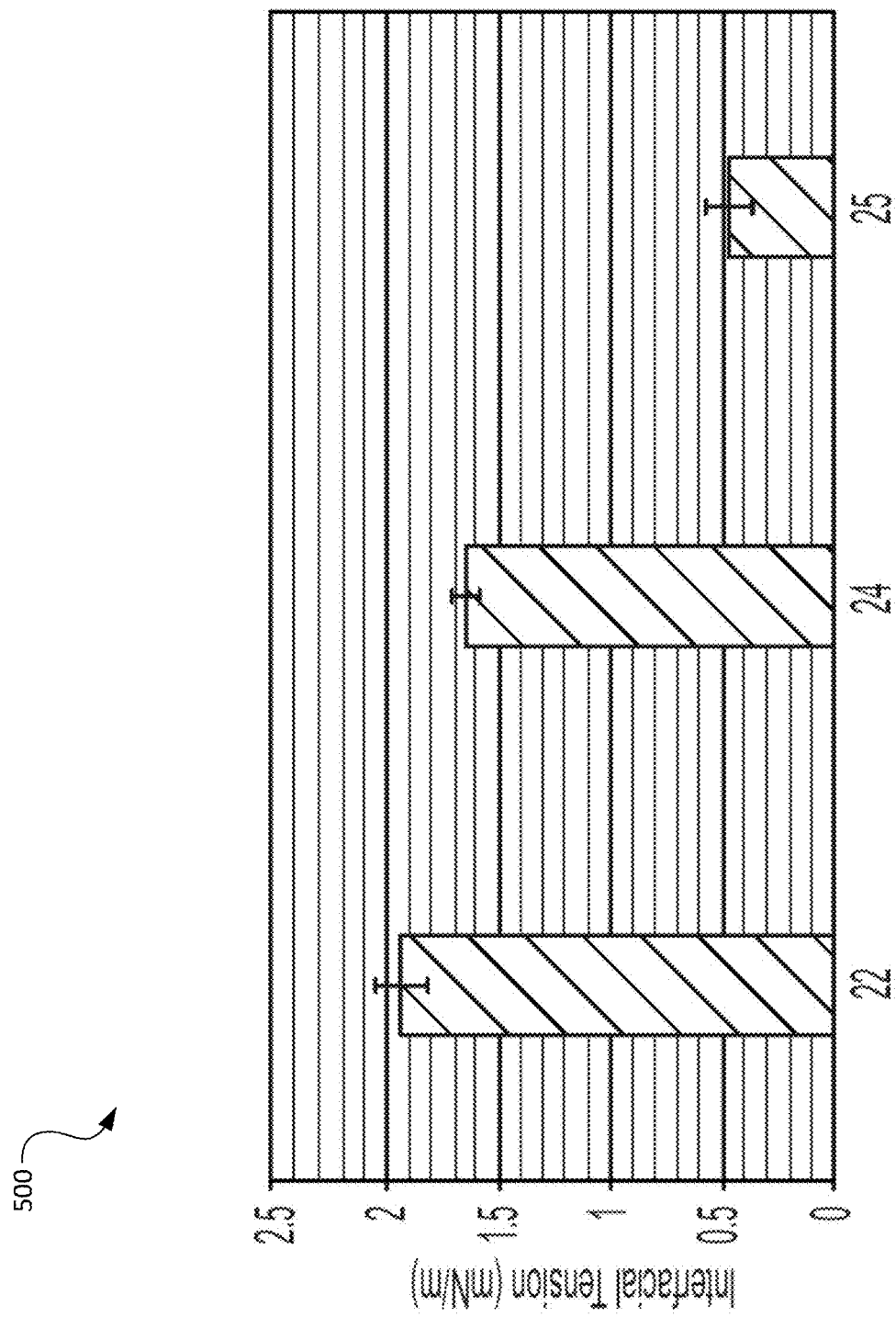
FIG. 5 is a graph illustrating interfacial tension parameters in a foaming formulation according to some aspects of the present disclosure.

FIG. 5 is a graph 500 illustrating interfacial tension parameters for different foaming formulations using Delaware basin oil. The interfacial tension between hydrocarbon fluids and a foam generated using the different foaming formulations in Table 1 is shown. All variations of the foaming formulation exhibit positive interfacial tension parameters indicating a good spreading of the foam across the fluid surface. Formulation 1 shows the strongest interfacial tension parameters indicating strong spreading, while Formulation 3 exhibits low spreading characteristics. Thus, the spread of volumes of produced foam can be increased or decreased by using different proportions of surfactant blend to demulsifier in the foaming formulations.

Figure 6:
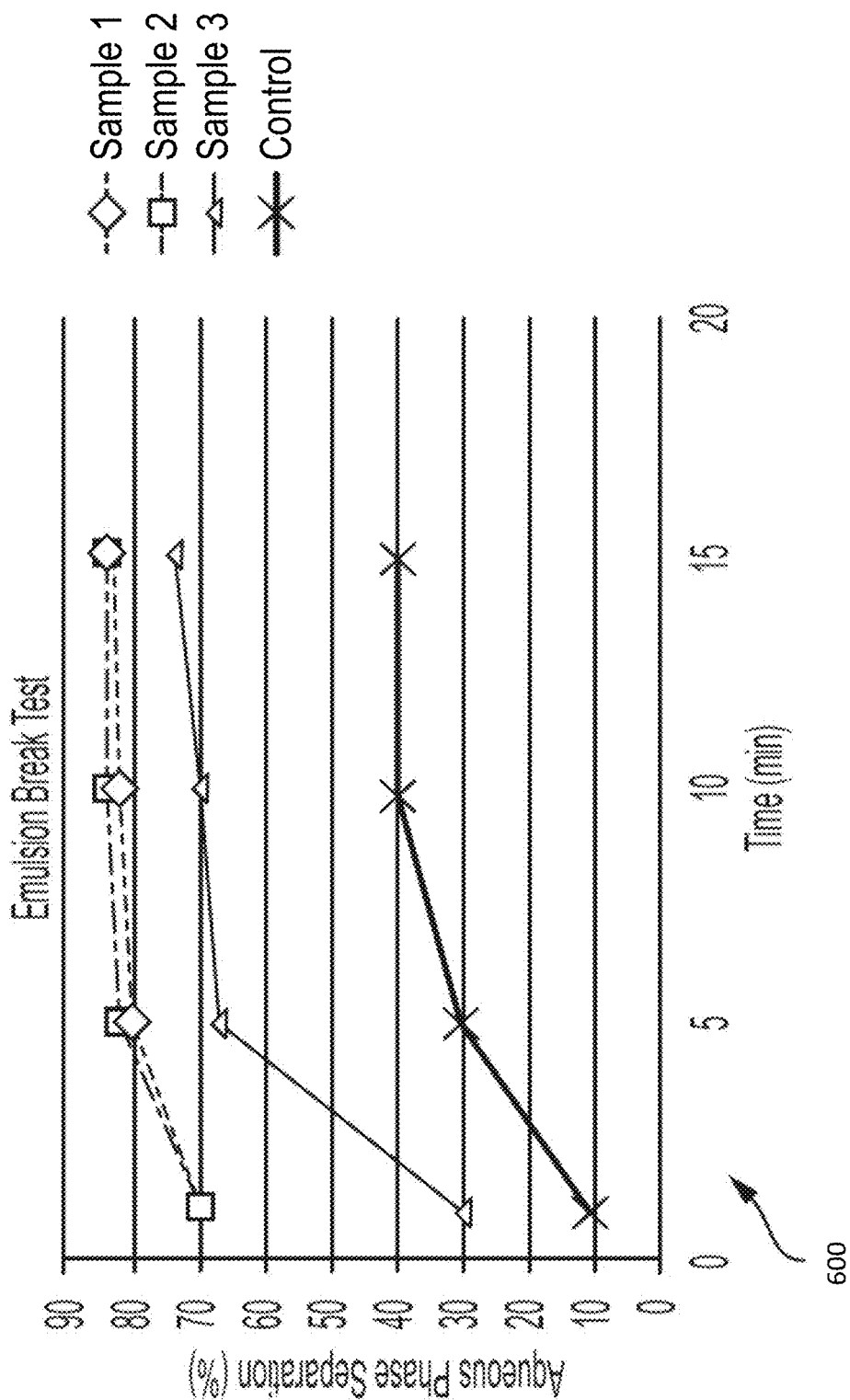
FIG. 6 is a graph illustrating an emulsion break test using crude oil with an API gravity of 29.6 according to some aspects of the present disclosure.
Figure 7:
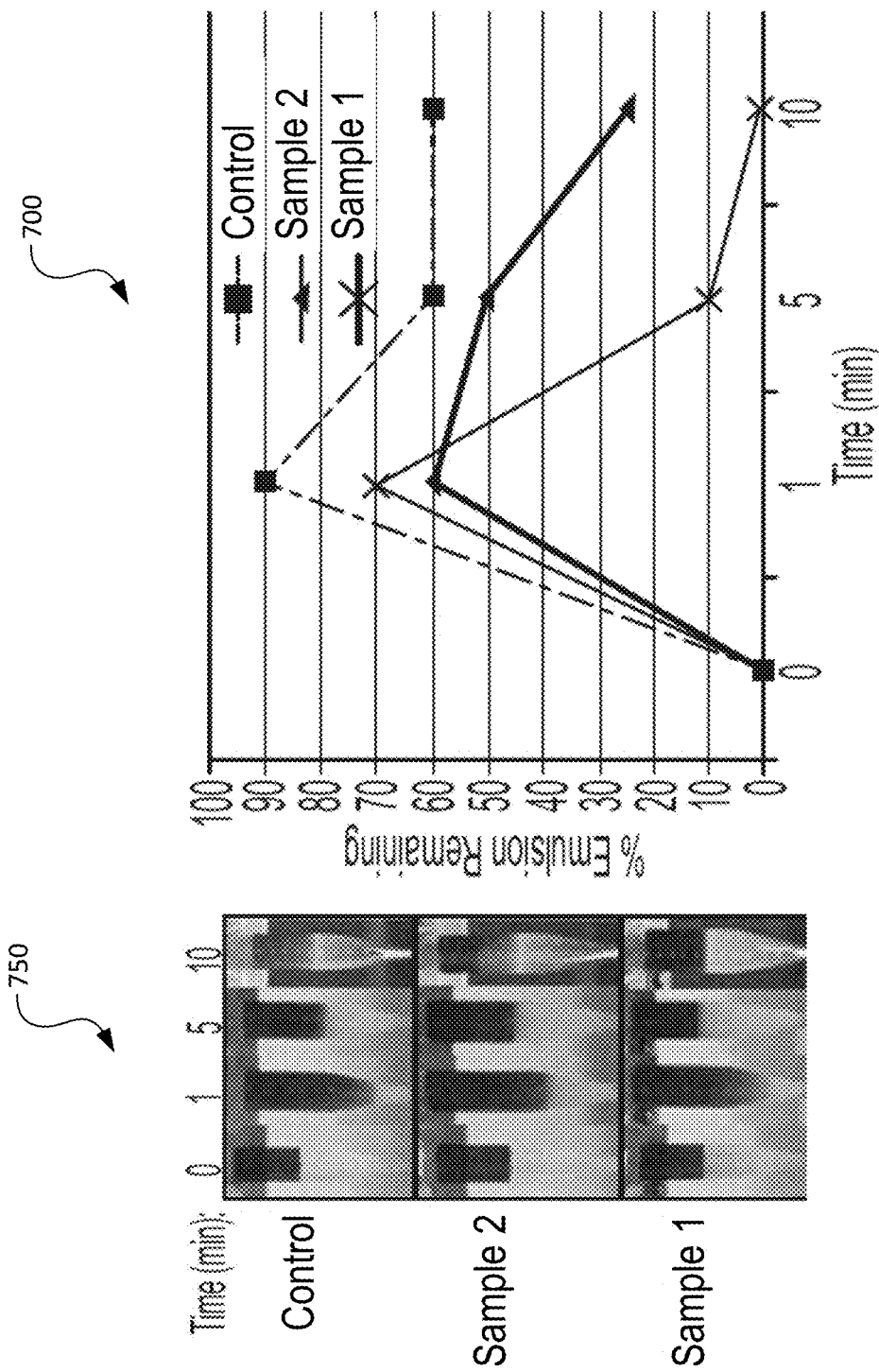
FIG. 7 is a graph illustrating an emulsion break test using crude oil with an API gravity of 41.6 according to some aspects of the present disclosure.

With reference to FIG. 6 and FIG. 7, the results of multiple emulsion break tests are illustrated. To generate these data, emulsions of a crude oil and an aqueous solution were created and then amounts of the different foaming formulations and a control formulation were added to different samples and the samples monitored over time to determine the aqueous phase separation fraction or the fraction of emulsion remaining. FIG. 6 is a graph 600 showing an emulsion break test using crude oil from the Gulf of Mexico with an API gravity of 28.6. In graph 600, a higher value indicates better separation. The aqueous phase separation over time is shown for each of the foaming formulations of Table 1. The graph 600 shows that Formulations 1 and 2 generate high separation of the emulsions quickly as compared to the control. Foaming formulations that result in the least amount of emulsion possible are desirable, so with the addition of the Demulsifier 1 or Demulsifier 2, a higher percent of phase separation with minimal to no emulsion in either the hydrocarbon or aqueous phase is possible.

FIG. 7 includes a graph 700 illustrating an emulsion break test using Delaware basin crude oil with an API gravity of 41.6. In graph 700, a lower value indicates better separation. For each of the foaming formulations of Table 1, the fraction of the emulsion remaining is shown over time. Similar to the emulsion break test results shown in FIG. 6 using Gulf of Mexico crude oil, the control surfactant formulation did not perform as well for breaking an emulsion of the Delaware basin crude oil as the foaming formulations including a demulsifier. Photographs 750 of the samples are also shown in FIG. 7. The addition of the demulsifier can limit the emulsion that forms in the hydrocarbon phase and allows for more prompt separation. The addition of Demulsifier 1 or Demulsifier 2 to the formulation can break emulsions in both heavier and lighter oils.

Figure 8:
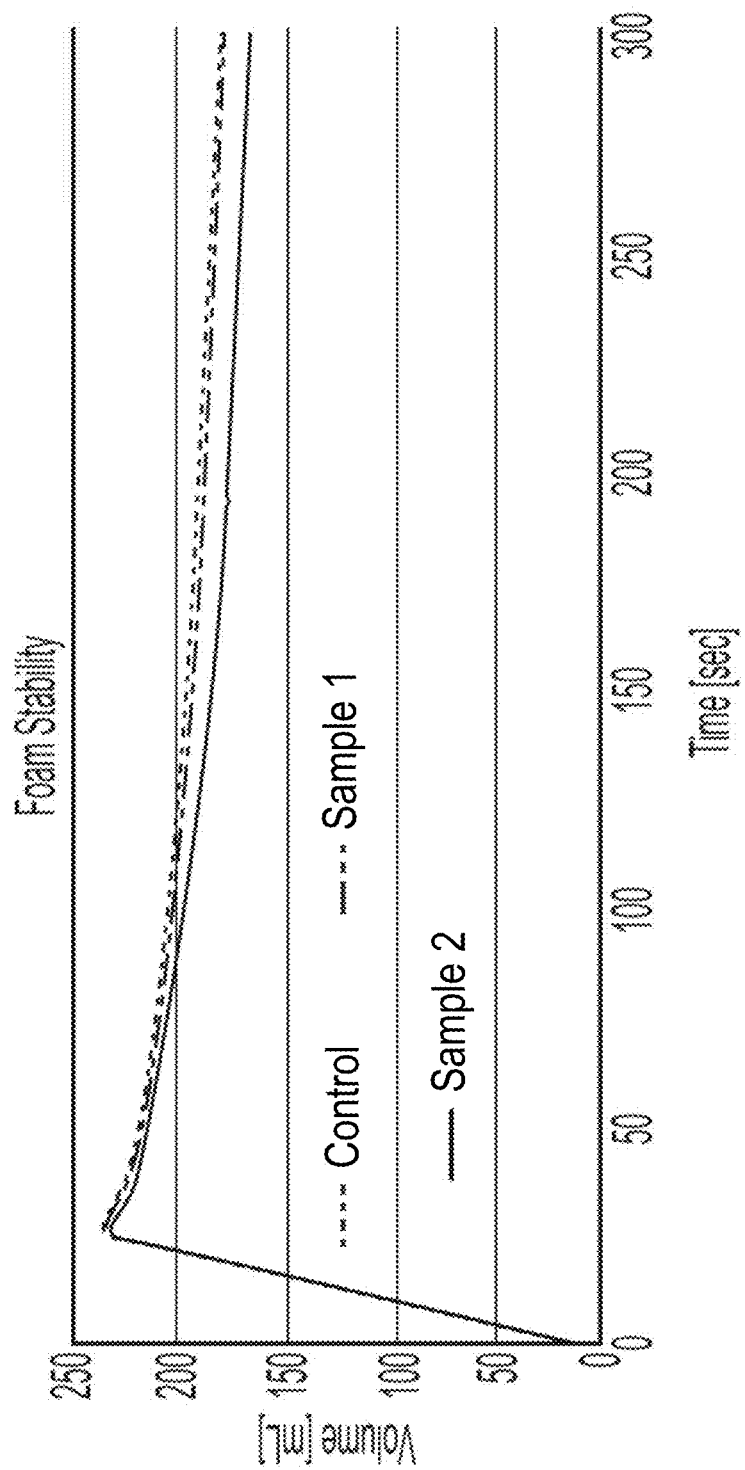
FIG. 8 is a graph illustrating the stability of foams over time according to some aspects of the present disclosure.

FIG. 8 is a graph 800 illustrating the stability of foams over time. For generation of the data in FIG. 8, foams were generated using the foaming formulations including Demulsifier 1 and Demulsifier 2, and no demulsifier as a control. The volume of foam was monitored as a function of time. The results indicate that the addition of the demulsifier does not appear to substantially impact the stability of the produced foams. The control blend (Surfactant 1 and Surfactant 2) and the blend with Demulsifier 1 exhibit foam performance characteristics that are-not significantly different from one another. While the addition of Demulsifier 2 led to a foam degradation rate that was slightly higher than the control and Demulsifier 1 blend, the overall performance and stability of the foam does not appear to be hindered.

In some aspects, systems, methods, and foaming formulations for generation of foam in a subterranean reservoir for use in hydrocarbon production are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a method comprising positioning concentric tubing in a wellbore within a subterranean formation to position an exit orifice of the concentric tubing at a target zone of the subterranean formation; injecting a foaming formulation through a first flow path of the concentric tubing to the target zone of the subterranean formation, wherein the foaming formulation comprises an aqueous base fluid, one or more surfactants, and one or more demulsifiers; and injecting a blowing gas through a second flow path of the concentric tubing to the target zone of the subterranean formation, wherein the foaming formulation and the blowing gas interact at the target zone of the subterranean formation to generate a foam comprising the foaming formulation and the blowing gas, and wherein the first flow path and the second flow path separate the foaming formulation and the blowing gas prior to the foaming formulation and the blowing gas interacting within the target zone of the subterranean formation.

Example 2 is the method of example 1, wherein the one or more surfactants are selected from the group consisting of anionic surfactants, amphoteric surfactants, and non-ionic surfactants.

Example 3 is the method of examples 1-2, wherein the one or more surfactants are selected from the group consisting of sulfate surfactants, sulfonate surfactants, phosphate surfactants, carboxylate surfactants, organosulfate surfactants, alkyl sulfate surfactants, sulfate esters of ethoxylated fatty alcohol surfactants, alpha olefin sulfonates, alkyl benzene sulfonates, cocoamidopropyl betaine, sodium lauryl sulfate, sodium lauryl ether sulfate, and any combination of these.

Example 4 is the method of examples 1-3, wherein the one or more demulsifiers are selected from the group consisting of alkyphenol demulsifiers, alkylphenol ethoxylate demulsifiers, phenolic resin demulsifiers, and any combination of these.

Example 5 is the method of examples 1-4, wherein the one or more demulsifiers are selected from the group consisting of ethoxylated phenolic resin demulsifiers, epoxy resin demulsifiers, ethoxylated epoxy resin demulsifiers, polytheyleneimine demulsifiers, ethoyxylated polytheyleneimine demulsifiers, polyamine demulsifiers, ethoxylated polyamine demulsifiers, polyol demulsifiers, ethoxylated polyol demulsifiers, diepoxide demulsifiers, ethoxylated diepoxide demulsifiers, nonylphenol ethoxylate resin, and any combination of these.

Example 6 is the method of examples 1-5, wherein the one or more surfactants are present in the foaming formulation at a concentration of from about 0.1 wt. % to about 30 wt. %, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, or 30 wt. % based on a total weight of the foaming formulation.

Example 7 is the method of examples 1-6, wherein the one or more demulsifiers are present in the foaming formulation at a concentration of from about 0.1 wt. % to about 20 wt. %, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, or 20 wt. % based on a total weight of the foaming formulation.

Example 8 is the method of examples 1-7, wherein the aqueous base fluid is present in the foaming formulation at a concentrations of from about 40 wt. % to about 80 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. %, 55 wt. %, 56 wt. %, 57 wt. %, 58 wt. %, 59 wt. %, 60 wt. %, 61 wt. %, 62 wt. %, 63 wt. %, 64 wt. %, 65 wt. %, 66 wt. %, 67 wt. %, 68 wt. %, 69 wt. %, 70 wt. %, 71 wt. %, 72 wt. %, 73 wt. %, 74 wt. %, 75 wt. %, 76 wt. %, 77 wt. %, 78 wt. %, 79 wt. %, or 80 wt. % based on a total weight of the foaming formulation.

Example 9 is the method of examples 1-8, wherein the one or more surfactants are present in the foaming formulation at a concentration of from about 0.1 wt. % to about 30 wt. %, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt.

%, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, or 30 wt. % based on a total weight of the foaming formulation.

Example 10 is the method of examples 1-9, wherein the one or more demulsifiers are present in the foaming formulation at a relative concentration of from about 5% to about 20%, 5%, 6%, 7%, 8%, 9%, 10%, 11%, 12%, 13%, 14%, 15%, 16%, 17%, 18%, 19% or 20% based on a total weight of the one or more surfactants and the one or more demulsifiers in the foaming formulation, and wherein the one or more surfactants are present in the foaming formulation at a relative concentration of from about 80% to about 95%, 80%, 81%, 82%, 83%, 84%, 85%, 86%, 87%, 88%, 89%, 90%, 91%, 92%, 93%, 94%, or 95% based on a total weight of the one or more surfactants and the one or more demulsifiers in the foaming formulation.

Example 11 is the method of examples 1-10, wherein the blowing gas comprises a hydrocarbon gas or a mixture of the hydrocarbon gas and an inert gas, or wherein injecting the blowing gas through the second flow path comprises alternating injections of the hydrocarbon gas and the inert gas.

Example 12 is the method of examples 1-11, wherein one or both of the blowing gas or the foaming formulation exit the concentric tubing via one or more jets, and wherein the one or more jets provide turbulence during interaction of the foaming formulation and the blowing gas to generate the foam.

Example 13 is the method of examples 1-12, wherein positioning the concentric tubing down the wellbore of the subterranean formation comprises positioning one or more exit orifices of the concentric tubing proximal to a perforation of the target production zone within subterranean formation.

Example 14 is the method of examples 1-13, further comprising modifying a rate of injecting the foaming formulation, or a rate of injecting the blowing gas, or both to alter a production rate of the foam, a volume of the foam, or a quality of the foam.

Example 15 is the method of examples 1-14, further comprising: preparing the foaming formulation by creating a mixture of the one or more surfactants and the one or more demulsifiers in real time as the foaming formulation is injected through the first flow path; and adjusting ratios of the one or more surfactants and the one or more demulsifiers in the mixture in real time as the foaming formulation is injected through the first flow path.

Example 16 is the method of examples 1-15, further comprising receiving one or more downhole pressure values and adjusting ratios of the one or more surfactants and the one or more demulsifiers in the foaming formulation in real time based on the one or more downhole pressure values.

Example 17 is the method of examples 1-16, further comprising: positioning the exit orifice of the concentric tubing at a second target zone of the subterranean formation; and injecting the foaming formulation through the first flow path of the concentric tubing to the second target zone of the subterranean formation; injecting the blowing gas through the second flow path of the concentric tubing to the second target zone of the subterranean formation, wherein interaction of the foaming formulation and the blowing gas at the second target zone of the subterranean formation generates additional foam comprising the foaming formulation and the blowing gas.

Example 18 is a foaming formulation that is injectable through a first flow path of concentric tubing for interacting with blowing gas exiting from a second path of the concentric tubing and generating foam at a target zone of a subterranean formation, the foaming formulation comprising Example 19 is the foaming formulation of example 18, wherein the one or more surfactants are selected from the group consisting of anionic surfactants, amphoteric surfactants, non-ionic surfactants, and any combination of these.

Example 20 is the foaming formulation of examples 18-19, wherein the one or more surfactants are selected from the group consisting of sulfate surfactants, sulfonate surfactants, phosphate surfactants, carboxylate surfactants, organosulfate surfactants, alkyl sulfate surfactants, sulfate esters of ethoxylated fatty alcohol surfactants, alpha olefin sulfonates, alkyl benzene sulfonates, cocoamidopropyl betaine, sodium lauryl sulfate, sodium lauryl ether sulfate, and any combination of these.

Example 21 is the foaming formulation of examples 18-20, wherein the one or more demulsifiers are selected from the group consisting of alkyphenol demulsifiers, alkylphenol ethoxylate demulsifiers, phenolic resin demulsifiers, and any combination of these.

Example 22 is the foaming formulation of examples 18-21, wherein the one or more demulsifiers are selected from the group consisting of ethoxylated phenolic resin demulsifiers, epoxy resin demulsifiers, ethoxylated epoxy resin demulsifiers, polytheyleneimine demulsifiers, ethoyxylated polytheyleneimine demulsifiers, polyamine demulsifiers, ethoxylated polyamine demulsifiers, polyol demulsifiers, ethoxylated polyol demulsifiers, diepoxide demulsifiers, ethoxylated diepoxide demulsifiers, nonylphenol ethoxylate resin, and any combination of these.

Example 23 is the foaming formulation of examples 18-22, comprising from about 0.1 wt. % to about 30 wt. % of the one or more surfactants, from about 0.1 wt. % to about 20 wt. % of the one or more demulsifiers, and from about 40 wt. % to about 80 wt. % of the aqueous base fluid.

Example 24 is the foaming formulation of examples 18-23, wherein the one or more demulsifiers are present in the foaming formulation at a relative concentration of from about 5% to about 20%, 5%, 6%, 7%, 8%, 9%, 10%, 11%, 12%, 13%, 14%, 15%, 16%, 17%, 18%, 19% or 20% based on a total weight of the one or more surfactants and the one or more demulsifiers in the foaming formulation, and wherein the one or more surfactants are present in the foaming formulation at a relative concentration of from about 80% to about 95%, 80%, 81%, 82%, 83%, 84%, 85%, 86%, 87%, 88%, 89%, 90%, 91%, 92%, 93%, 94%, or 95% based on a total weight of the one or more surfactants and the one or more demulsifiers in the foaming formulation.

Example 25 is a system for generating foam at a target zone of a subterranean formation, the system comprising concentric tubing positionable in a wellbore within a subterranean formation, the concentric tubing having a first flow path for injecting a foaming formulation into a target zone of the subterranean formation and a second flow path for injecting a blowing gas into the subterranean formation, wherein the foaming formulation comprises an aqueous base fluid, one or more surfactants, and one or more demulsifiers; one or more reservoirs containing one or more of the foaming formulation, the aqueous base fluid, the one or more surfactants, or the one or more demulsifiers; a source of the blowing gas; pumping equipment, such as a first pump, in fluid communication with the one or more reservoirs for injecting the foaming formulation or the component thereof into the target zone of the subterranean formation via the first flow path of the concentric tubing; and pumping equipment, such as a second pump, in fluid communication with the source of the blowing gas for injecting the blowing gas into the target zone of the subterranean formation via the second flow path of the concentric tubing.

Example 26 is the system of example 25, wherein the concentric tubing comprises one or more jets for creating turbulence during mixing of the blowing gas and the foaming formulation upon exiting the concentric tubing.

Example 27 is the system of example 25-26, comprising or further comprising: mixing equipment in fluid communication with the one or more reservoirs for generating the foaming formulation from the aqueous base fluid, the one or more surfactants, and the one or more demulsifiers; and one or more processors and a non-transitory computer readable storage medium containing instructions that, when executed by the one or more processors, cause the one or more processors to perform operations including one or more of: adjusting ratios of the one or more surfactants and the one or more demulsifiers in the foaming formulation in real time as the foaming formulation is injected through the first flow path; adjusting a flow rate of the foaming formulation in real time as the foaming formulation is injected through the first flow path; adjusting a flow rate of the blowing gas in real time as the blowing gas is injected through the second flow path; or receiving pressure measurements from one or more pressure sensors in the wellbore.

Example 29 is the system of examples 27, wherein the operations correspond to all or portions of the method of examples 1-17.

Example 29 is the system of examples 25-28, wherein the source of the blowing gas comprises a blowing gas reservoir.

Example 30 is the system of examples 25-29, wherein the concentric tubing is positioned within the wellbore or wherein an exit orifice of the concentric tubing is positioned at the target zone of the subterranean formation.

Example 31 is the system of examples 25-30, wherein the one or more reservoirs contain different pre-blended foaming formulations.

Example 32 is the system of examples 25-31, wherein the source of the blowing gas comprises a hydrocarbon gas source and an inert gas source Example 33 is the system of examples 25-32, wherein the foaming formulation is the foaming formulation of examples 18-24.

Example 34 is the method of examples 1-17, the foaming formulation of examples 18-24, or the system of examples 25-33, wherein the subterranean formation comprises a hydrocarbon reservoir, and wherein the foam is used in the hydrocarbon reservoir in an enhanced oil recovery process, a fracturing (fracking) process, a huff and puff process, or a flooding process.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
positioning concentric tubing in a wellbore within a subterranean formation to position an exit orifice of the concentric tubing at a target zone of the subterranean formation;
injecting a foaming formulation through a first flow path of the concentric tubing to the target zone of the subterranean formation, wherein the foaming formulation comprises an aqueous base fluid, one or more surfactants, and one or more demulsifiers; and
while injecting the foaming formulation through the first flow path of the concentric tubing, simultaneously injecting a blowing gas through a second flow path of the concentric tubing to the target zone of the subterranean formation,
wherein the foaming formulation and the blowing gas interact at the target zone of the subterranean formation to generate a foam comprising the foaming formulation and the blowing gas, wherein one or both of the blowing gas or the foaming formulation exit the concentric tubing via one or more jets, wherein the one or more jets provide turbulence during interaction of the foaming formulation and the blowing gas to generate the foam, and wherein the first flow path and the second flow path separate the foaming formulation and the blowing gas prior to the foaming formulation and the blowing gas interacting within the target zone of the subterranean formation.

2. The method of claim 1, wherein the one or more surfactants are selected from the group consisting of anionic surfactants, amphoteric surfactants, and non-ionic surfactants.

3. The method of claim 1, wherein the one or more surfactants are selected from the group consisting of sulfate surfactants, sulfonate surfactants, phosphate surfactants, carboxylate surfactants, organosulfate surfactants, alkyl sulfate surfactants, sulfate esters of ethoxylated fatty alcohol surfactants, alpha olefin sulfonates, alkyl benzene sulfonates, cocoamidopropyl betaine, sodium lauryl sulfate, sodium lauryl ether sulfate, and any combination of these.

4. The method of claim 1, wherein the one or more demulsifiers are selected from the group consisting of alkyphenol demulsifiers, alkylphenol ethoxylate demulsifiers, phenolic resin demulsifiers, and any combination of these.

5. The method of claim 1, wherein the one or more demulsifiers are selected from the group consisting of ethoxylated phenolic resin demulsifiers, epoxy resin demulsifiers, ethoxylated epoxy resin demulsifiers, polytheyleneimine demulsifiers, ethoyxylated polytheyleneimine demulsifiers, polyamine demulsifiers, ethoxylated polyamine demulsifiers, polyol demulsifiers, ethoxylated polyol demulsifiers, diepoxide demulsifiers, ethoxylated diepoxide demulsifiers, nonylphenol ethoxylate resin, and any combination of these.

6. The method of claim 1, wherein the blowing gas comprises a hydrocarbon gas or a mixture of the hydrocarbon gas and an inert gas.

7. The method of claim 1, further comprising modifying a rate of injecting the foaming formulation, or a rate of injecting the blowing gas, or both, to alter a production rate of the foam, a volume of the foam, or a quality of the foam.

8. The method of claim 1, further comprising:
preparing the foaming formulation by creating a mixture of the one or more surfactants and the one or more demulsifiers in real time as the foaming formulation is injected through the first flow path; and
adjusting ratios of the one or more surfactants and the one or more demulsifiers in the mixture in real time as the foaming formulation is injected through the first flow path.

9. The method of claim 1, further comprising:
positioning the exit orifice of the concentric tubing at a second target zone of the subterranean formation;

injecting the foaming formulation through the first flow path of the concentric tubing to the second target zone of the subterranean formation; and injecting the blowing gas through the second flow path of the concentric tubing to the second target zone of the subterranean formation, wherein interaction of the foaming formulation and the blowing gas at the second target zone of the subterranean formation generates additional foam comprising the foaming formulation and the blowing gas.

10. The method of claim 1, wherein the foaming formulation comprises from about 0.1 wt. % to about 30 wt. % of the one or more surfactants, from about 0.1 wt. % to about 20 wt. % of the one or more demulsifiers, and from about 40 wt. % to about 80 wt. % of the aqueous base fluid.

11. The method of claim 6, wherein injecting the blowing gas through the second flow path comprises alternating injections of the hydrocarbon gas and the inert gas.

12. A system for generating foam at a target zone of a subterranean formation, the system comprising:
concentric tubing configured to be positioned in a wellbore within a subterranean formation, the concentric tubing having a first flow path for injecting a foaming formulation into a target zone of the subterranean formation and a second flow path for injecting a blowing gas into the target zone subterranean formation simultaneously while injecting the foaming formulation, wherein the foaming formulation comprises an aqueous base fluid, one or more surfactants, and one or more demulsifiers, and wherein the concentric tubing includes one or more jets in communication with the first flow path or second flow path for generating turbulence during mixing of the blowing gas and the foaming formulation upon exiting the concentric tubing;
one or more reservoirs containing one or more of the foaming formulation, the aqueous base fluid, the one or more surfactants, or the one or more demulsifiers;
a source of the blowing gas;
a first pump in fluid communication with the one or more reservoirs for injecting the foaming formulation or a component thereof into the target zone of the subterranean formation via the first flow path of the concentric tubing; and
a second pump in fluid communication with the source of the blowing gas for injecting the blowing gas into the target zone of the subterranean formation via the second flow path of the concentric tubing.

13. The system of claim 12, comprising or further comprising:
a mixer in fluid communication with the one or more reservoirs for generating the foaming formulation from the aqueous base fluid, the one or more surfactants, and the one or more demulsifiers; and
one or more processors and a non-transitory computer readable storage medium containing instructions that, when executed by the one or more processors, cause the one or more processors to perform operations including one or more of:
adjusting ratios of the one or more surfactants and the one or more demulsifiers in the foaming formulation in real time as the foaming formulation is injected through the first flow path;
adjusting a flow rate of the foaming formulation in real time as the foaming formulation is injected through the first flow path;
adjusting a flow rate of the blowing gas in real time as the blowing gas is injected through the second flow path; or
receiving pressure measurements from one or more pressure sensors in the wellbore.

14. The system of claim 12, wherein the one or more reservoirs contain different pre-blended foaming formulations, and wherein the source of the blowing gas comprises a hydrocarbon gas source and an inert gas source.

15. The system of claim 12, wherein the foaming formulation comprises from about 0.1 wt. % to about 30 wt. % of the one or more surfactants, from about 0.1 wt. % to about 20 wt. % of the one or more demulsifiers, and from about 40 wt. % to about 80 wt. % of the aqueous base fluid.

16. A method comprising:
positioning concentric tubing in a wellbore within a subterranean formation to position an exit orifice of the concentric tubing at a target zone of the subterranean formation;
injecting a foaming formulation through a first flow path of the concentric tubing to the target zone of the subterranean formation, wherein the foaming formulation comprises an aqueous base fluid, one or more surfactants, and one or more demulsifiers, and wherein the foaming formulation is prepared by creating a mixture of the one or more surfactants and the one or more demulsifiers in real time as the foaming formulation is injected through the first flow path;
adjusting ratios of the one or more surfactants and the one or more demulsifiers in the mixture in real time as the foaming formulation is injected through the first flow path; and
while injecting the foaming formulation through the first flow path of the concentric tubing, simultaneously injecting a blowing gas through a second flow path of the concentric tubing to the target zone of the subterranean formation,
wherein the foaming formulation and the blowing gas interact at the target zone of the subterranean formation to generate a foam comprising the foaming formulation and the blowing gas, and wherein the first flow path and the second flow path separate the foaming formulation and the blowing gas prior to the foaming formulation and the blowing gas interacting within the target zone of the subterranean formation.

17. The method of claim 16, further comprising modifying a rate of injecting the foaming formulation, or a rate of injecting the blowing gas, or both, to alter a production rate of the foam, a volume of the foam, or a quality of the foam.

18. The method of claim 16, wherein one or both of the blowing gas or the foaming formulation exit the concentric tubing via one or more jets, and wherein the one or more jets provide turbulence during interaction of the foaming formulation and the blowing gas to generate the foam.

* * * * *